US009400734B2

(12) United States Patent
Aharonov et al.

(10) Patent No.: US 9,400,734 B2
(45) Date of Patent: Jul. 26, 2016

(54) APPARATUSES AND METHODS FOR GENERATING EVENT CODES INCLUDING EVENT SOURCE

(71) Applicant: SanDisk Technologies Inc., Plano, TX (US)

(72) Inventors: Arseniy Aharonov, Hod Ha-Sharon (IL); David Brief, Modiin (IL); Asaf Gueta, Or Yehuda (IL)

(73) Assignee: SanDisk Technologies LLC, Plano, TX (US)

( * ) Notice: Subject to any disclaimer, the term of this patent is extended or adjusted under 35 U.S.C. 154(b) by 98 days.

(21) Appl. No.: 14/276,744

(22) Filed: May 13, 2014

(65) Prior Publication Data

US 2015/0082313 A1 Mar. 19, 2015

Related U.S. Application Data

(60) Provisional application No. 61/878,009, filed on Sep. 15, 2013.

(51) Int. Cl.
*G06F 9/46* (2006.01)
*G06F 3/00* (2006.01)
*G06F 11/36* (2006.01)
*G06F 9/48* (2006.01)

(52) U.S. Cl.
CPC .............. *G06F 11/36* (2013.01); *G06F 9/4843* (2013.01); *G06F 11/3636* (2013.01)

(58) Field of Classification Search
None
See application file for complete search history.

(56) References Cited

U.S. PATENT DOCUMENTS

| | | | |
|---|---|---|---|
| 5,899,578 A * | 5/1999 | Yanagihara et al. | 386/239 |
| 6,345,295 B1 | 2/2002 | Beardsley et al. | |
| 6,470,376 B1 * | 10/2002 | Tanaka et al. | 718/108 |
| 6,697,968 B1 | 2/2004 | Orfali | |
| 7,080,283 B1 | 7/2006 | Songer et al. | |
| 7,929,523 B2 * | 4/2011 | Shenfield et al. | 370/389 |
| 8,032,587 B2 * | 10/2011 | Chetuparambil et al. | 709/203 |
| 8,042,007 B1 | 10/2011 | Chan et al. | |
| 2002/0107841 A1 | 8/2002 | Hellerstein et al. | |
| 2002/0112058 A1 | 8/2002 | Weisman et al. | |
| 2005/0021708 A1 * | 1/2005 | Raghuraman et al. | 709/223 |
| 2005/0033553 A1 | 2/2005 | Swaine et al. | |
| 2005/0034001 A1 * | 2/2005 | Pontarelli | 713/320 |
| 2006/0259774 A1 | 11/2006 | Swoboda et al. | |

(Continued)

FOREIGN PATENT DOCUMENTS

WO WO 2010/136852 A1 12/2010
WO WO 2011/039570 A1 4/2011

*Primary Examiner* — Adam Lee
(74) *Attorney, Agent, or Firm* — Brinks Gilson & Lione

(57) ABSTRACT

Apparatuses and methods implemented therein are disclosed for generating event codes that include the source of the events that caused the generation of the event codes. In one embodiment the apparatus comprises a memory, a processor, logic element and an event generator. The memory is configured to store instructions corresponding to a scheduler and instructions corresponding to a first thread and a second thread. The processor is configured to execute instructions corresponding to the scheduler wherein the scheduler selects a one of the first or second thread wherein the processor executes instructions corresponding to the selected one of the first or second thread. The logic element is configured to receive an identifier corresponding to the selected thread and a received asynchronous event. The logic element produces a concatenated event identifier comprising the thread identifier and the received asynchronous event.

16 Claims, 9 Drawing Sheets

(56) References Cited

U.S. PATENT DOCUMENTS

| | | |
|---|---|---|
| 2008/0127116 A1 | 5/2008 | Kosche et al. |
| 2008/0155560 A1* | 6/2008 | Iwamoto ............ 719/318 |
| 2008/0209402 A1 | 8/2008 | Parkinson |
| 2009/0106771 A1* | 4/2009 | Benner et al. .......... 719/313 |
| 2009/0204951 A1 | 8/2009 | Laurenti et al. |
| 2010/0001769 A1 | 1/2010 | Brantley et al. |
| 2010/0057400 A1 | 3/2010 | Chou et al. |
| 2010/0107143 A1* | 4/2010 | Emberling ........ G06F 11/3072 717/128 |
| 2010/0161743 A1* | 6/2010 | Krishnamurthi et al. ..... 709/206 |
| 2010/0235836 A1 | 9/2010 | Bratanov |
| 2011/0289302 A1 | 11/2011 | Ubukata et al. |
| 2012/0131596 A1 | 5/2012 | Lefebvre et al. |
| 2012/0259865 A1* | 10/2012 | Lakshmanan et al. ........ 707/748 |
| 2015/0082325 A1* | 3/2015 | Aharonov et al. ............ 719/318 |

* cited by examiner

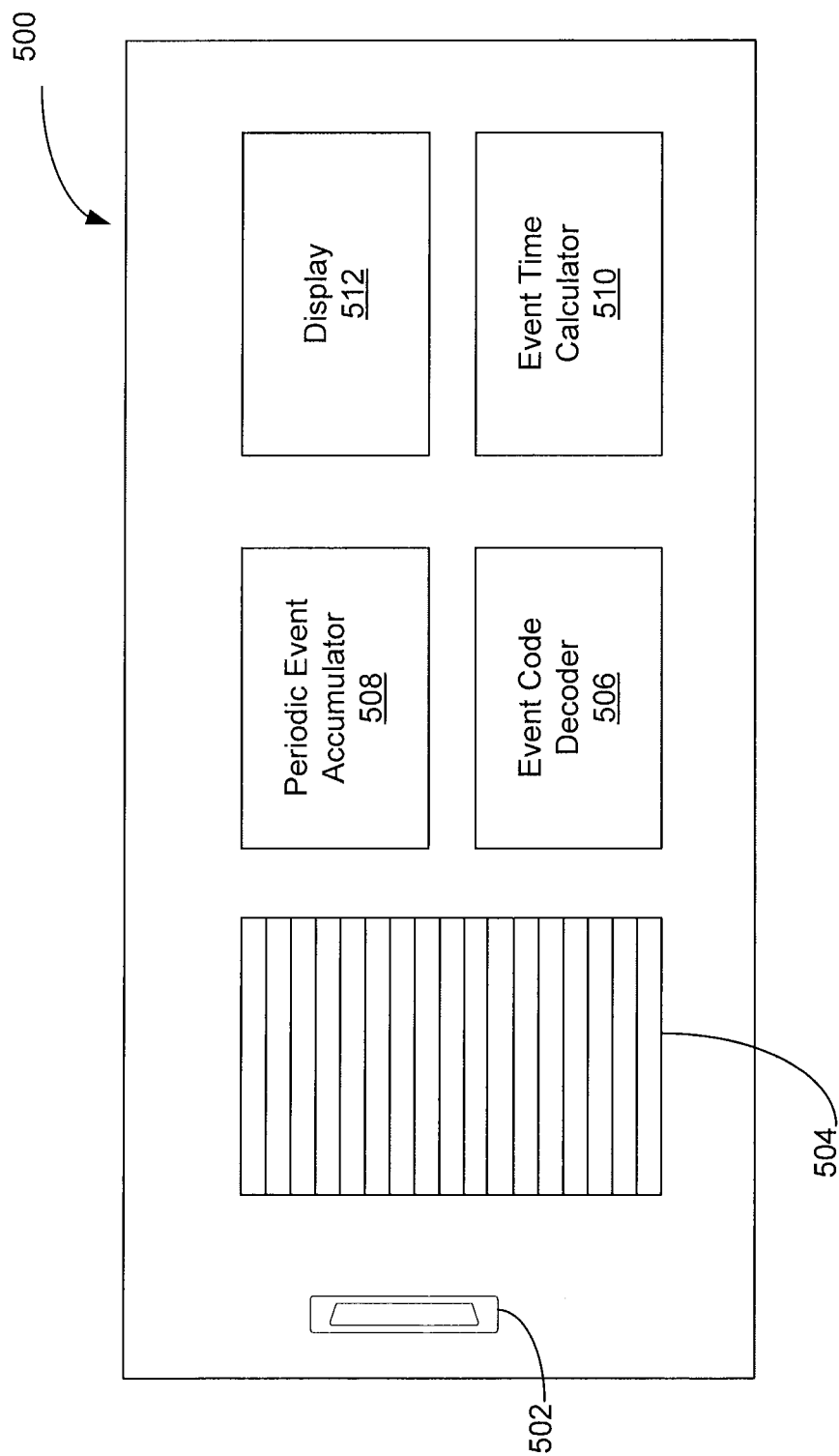

APPARATUSES AND METHODS FOR GENERATING EVENT CODES INCLUDING EVENT SOURCE

RELATED APPLICATIONS

The present application claims the benefit of U.S. Provisional Application No. 61/878,009, entitled "Apparatuses and Methods for Generating Event Codes Including Event Source," filed on Sep. 15, 2013, which is hereby incorporated by reference herein in its entirety.

TECHNICAL FIELD

This application relates generally to the generation of event codes in response to generated hardware and software events and the analysis of the generated event codes. More specifically, this application relates to generating compact time stamped event codes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Advances in technology have led to a proliferation of intelligent devices. Such devices are equipped with one or more processors. The continuing drop in prices of memory has allowed device makers to equip their intelligent devices with program and storage memory having increasingly large footprints. In part, because of the availability of large memory sizes, sophisticated feature-rich, multi-threading operating systems (OS) power and control intelligent devices, etc. This has in part allowed device manufacturers to provide users of the devices with an improved user experience.

However, this has contributed to the increased complexity of the devices. Debugging, integrating, and testing such devices presents unique challenges because of the complexity of the device architecture and speed of operation. To determine the root cause of device failures during development and deployment of such devices requires the creation of sophisticated high speed debugging tools and methods.

SUMMARY

In order to address the need for improved debugging and testing in a sophisticated device having hardware and software components, methods and apparatus are disclosed herein for generating and transmitting time stamped event codes generated during the run-time operation of the device. Separately, event tracing units are described that utilize and decode the generated time stamped event codes.

According to one aspect, an apparatus for generating event codes is disclosed. The apparatus comprises a memory configured to store instructions corresponding to a scheduler and instructions corresponding to a first thread and a second thread. The apparatus also comprises a processor configured to execute instructions corresponding to the scheduler wherein the scheduler selects a one of the first or second thread and wherein the processor executes instructions corresponding to the selected one of the first or second thread. Further the apparatus includes a logic element configured to receive an identifier corresponding to the selected thread and an asynchronous event and produce a concatenated event identifier, wherein the asynchronous event is received in response to the selected thread causing the execution of an instruction, wherein the asynchronous event indicates the execution of the instruction and wherein execution of the instruction may be caused by either the first thread or second thread.

According to another aspect, the method implemented in a device to generate an event code is disclosed. The method comprises receiving an identifier corresponding to either a selected one of a first or a second thread, wherein a scheduler selects the one of the first or second thread and wherein a processor executes instructions corresponding to the selected one of the first or second thread. Additionally, the method comprises generating concatenated event identifier comprising the identifier and a received asynchronous event, wherein the asynchronous event is received in response to the selected thread causing the execution an instruction, wherein the asynchronous event indicates the execution of the instruction and wherein execution of the instruction may be caused by either the first thread or second thread.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

FIG. 5 is a block diagram of an example event tracing unit that may receive and decode time stamped event codes generated by an event code generation unit.

DETAILED DESCRIPTION

Figure 1:
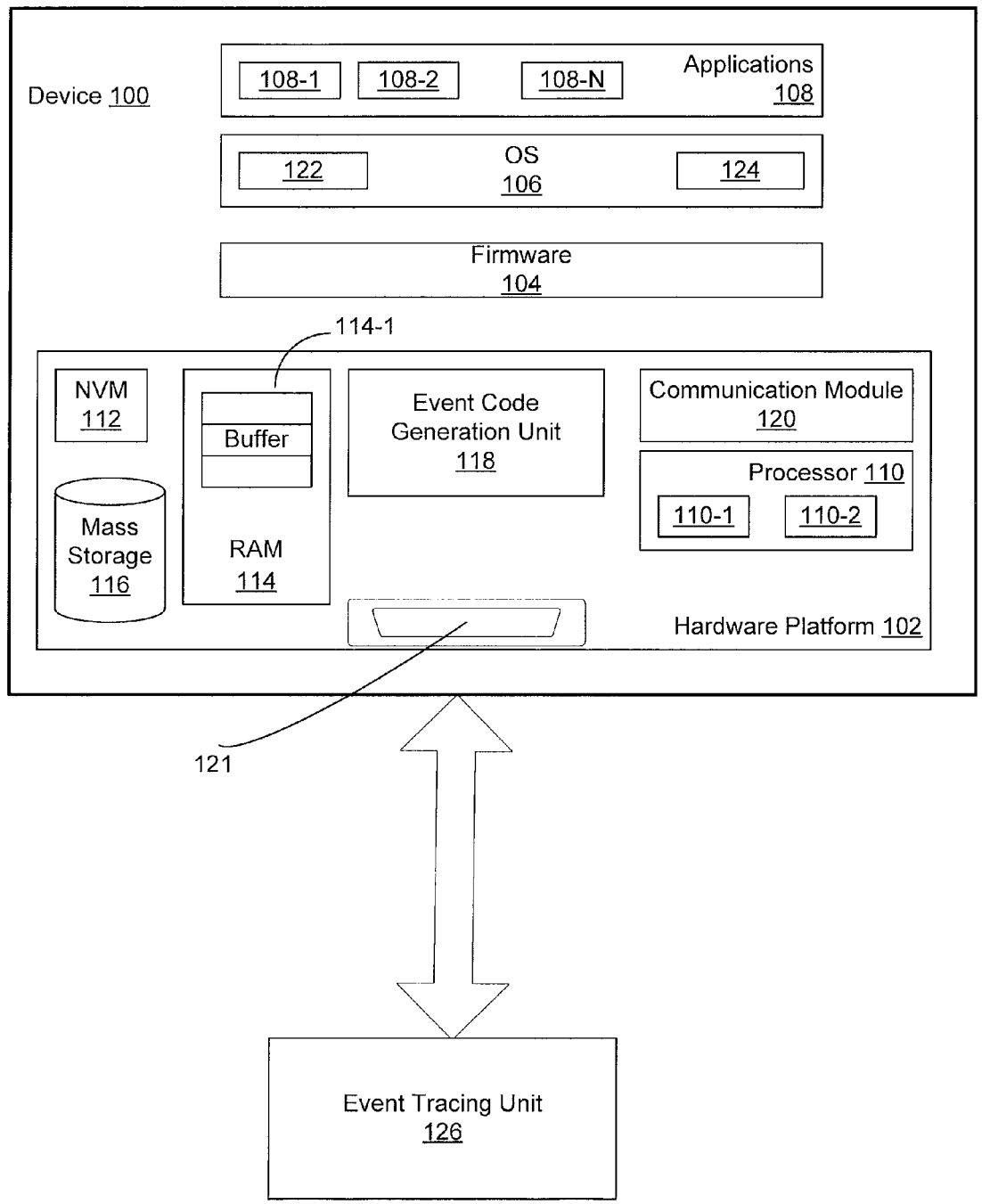
FIG. 1 is a block diagram of an example device that includes an event code generation unit configured to generate time stamped event codes in response to receiving events generated by elements of the example device.

Apparatuses and methods described herein generate event codes in response to receiving periodic or service events and asynchronous events from one or more hardware and software sources in a device, for example. A device may consist of any embedded system like a printer, a scanner, a cell phone, a digital camera etc. Hardware and/or software in the device may be configured to generate periodic events at regular intervals and with equal inter-event time spacing. Asynchronous events may be generated by hardware and software in response to the occurrence of a condition in the hardware or simply as an indication that a particular software instruction has or is being executed. The occurrence of asynchronous events cannot be generally predicted deterministically. The event codes may include a unique indication corresponding to a received event and additional information including an indication when the received event was generated. In one scenario, the event codes may be transmitted after they are generated. Also described are apparatus and methods that receive the event codes and provide an indication of when the events were generated and the source of the events.

In the following discussion, event codes generated in response to periodic events are referred to as periodic event codes and event codes generated in response to asynchronous events are referred to as asynchronous event codes. Examples of hardware generated events include a hardware interrupt being triggered by the reception of data via a communication port, completion of a write operation to a flash device etc. Software events may be configured for example to be generated when a particular variable in software is written or read from etc. Examples of configuring software events include the setting of memory access triggers. Hardware generated events and software events are examples of asynchronous events.

An event code as disclosed may include an identifier of the event, the source of the event and a time stamp indicating a time when the event occurred. Conventionally, a timestamp associated with an event generally corresponds to the time when an event occurs from an arbitrary initial point in time. The arbitrary initial point may correspond to when the device is powered on. Separately, in some instances a generated event code may include information corresponding to the operational status of the source of the event. In some scenarios, a generated periodic event code may not include a timestamp. Instead, in this scenario the identifier of the periodic event in the event code may be used to implicitly determine when the periodic event occurs with reference to the arbitrary initial point of time, since device power-up for example. In some other scenarios, generated asynchronous event codes may include a timestamp fraction or offset from a previously received periodic event instead of an explicit timestamp. An advantage of utilizing a timestamp fraction instead of an explicit time stamp as a reference to when the asynchronous event was generated is that the event code will occupy lesser data space when stored because the timestamp fraction corresponds only to a portion of the timestamp. In some instances, the apparatus may store the event codes for future analysis or transmission.

The generated event codes may be utilized to trace the operation of the hardware and execution of the software that generated the corresponding events. Tracing the operation of systems by utilizing event codes is frequently referred to as event tracing. Apparatuses and methods are also disclosed that receive and analyze the generated event codes and may generate a chronological depiction of the occurrence of the events to trace the operation of the hardware and the execution of the software based on the information in the received event codes. As an example, an event tracing unit receiving event codes may count or keep track of the number of periodic event codes received. By multiplying the number of event codes by the pre-configured or pre-determined inter-periodic event time, the system may calculate the exact or close to exact time when the last periodic event received was generated. On receiving an asynchronous event code, the event tracing unit may retrieve the time offset and add the time offset to the number corresponding to the product of the number of the last received periodic event code and the inter-periodic event time to determine when the asynchronous event that caused the generation of the asynchronous event code was generated by the hardware or software. For example, if asynchronous event code is received after N periodic event codes and if the timestamp fraction or offset in the asynchronous event code is X milliseconds since the last periodic event and if the inter-periodic event time is Y milliseconds, the event tracing unit may determine that the asynchronous event was generated after X+(N×Y) milliseconds since device power up.

FIG. 1 is a block diagram of example device 100 coupled to event tracing unit 126. Device 100 includes apparatus and implements methods that generate event codes in response to receiving periodic and asynchronous events from various elements and subsections of device 100. By way of example and without limitation, device 100 comprises hardware platform 102, firmware 104, operating system 106 and applications 108. In this example, hardware platform 102 comprises processor 110, non-volatile memory (NVM) 112, random access memory (RAM) 114, mass storage memory 116, event code generation unit 118, communication modules 120 and test ports 121. Communication module 120 may include one or more standard communication ports including but not limited to communication ports configured to operate according to RS-232, RS-482, IEEE 802.3, IEEE 802.11 etc.

Firmware 104 generally comprises software instructions that when executed by processor 110 configure and control elements of hardware platform 102. Firmware 104 may be stored in NVM 112 and copied to and executed by processor 110 from RAM 114. Applications 108 and operating system 106 may be stored in storage memory 116 and copied to and executed by processor 110 from RAM 114.

Operating system 106 includes software components like scheduler 122 and kernel 124. Examples of operating systems include LINUX, UCOS, WINDOWS, VXWORKS, PSOS etc. Kernel 124 includes software functionality that provides software services and software objects to applications 108. By way of example and without limitation, software objects include threads, queues, and/or semaphores. Applications 108 may invoke functionality in kernel 124 to create these software objects. Applications 108 include applications 108-1 . . . 108-N. Each application 108-1 . . . 108-N may be configured to operate within the context of a corresponding thread. Scheduler 122 determines which thread and consequently which one of applications 108-1 . . . 108-N will be executed by processor 110. Threads may be assigned different priority when they are created. Scheduler 122 generally causes processors 110 to first execute a thread with a higher priority. Threads and their corresponding applications when executed by processors 110 may invoke common software routines. Examples of common software routines include software instructions to transmit and receive data from input/output ports, software instructions to read and write to NVM 112 etc.

Event code generation unit 118 may receive asynchronous events from hardware platform 102, firmware 104, operating system 106 and applications 108. Event code generation unit 118 may also receive and/or generate periodic events. As previously described, in response to receiving asynchronous events and periodic events, event code generation unit 118 may generate corresponding event codes. As will be discussed in greater detail later, a generated event code may optionally include an identifier of the corresponding event, an indication corresponding to a time when the event was generated, status information of hardware platform 102, firmware 104, operating system 106 and applications 108, etc. In an embodiment, event code generation unit 118 may store generated event codes in buffer 114-1 that may be created in RAM 114. In another embodiment, event code generation unit 118 may store generated event codes in mass storage memory 116.

An event code generated by event code generation unit 118 may include not only an indication of the event that caused the generation of the event code but also a time when the event was generated. In this embodiment, the time when an asynchronous event was generated may be represented as the difference between the time when the asynchronous event was received and the time when a last periodic event was generated or received. This difference in time may be referred to as the time offset or a timestamp fraction.

In some embodiments, event code generation unit 118 may cause the generated event codes to be transmitted to remote event tracing unit 126 via test port 121. In other embodiments, event code generation unit 118 may cause the generated event codes to be transmitted to remote event tracing unit 126 via communication module 120.

Figure 2:
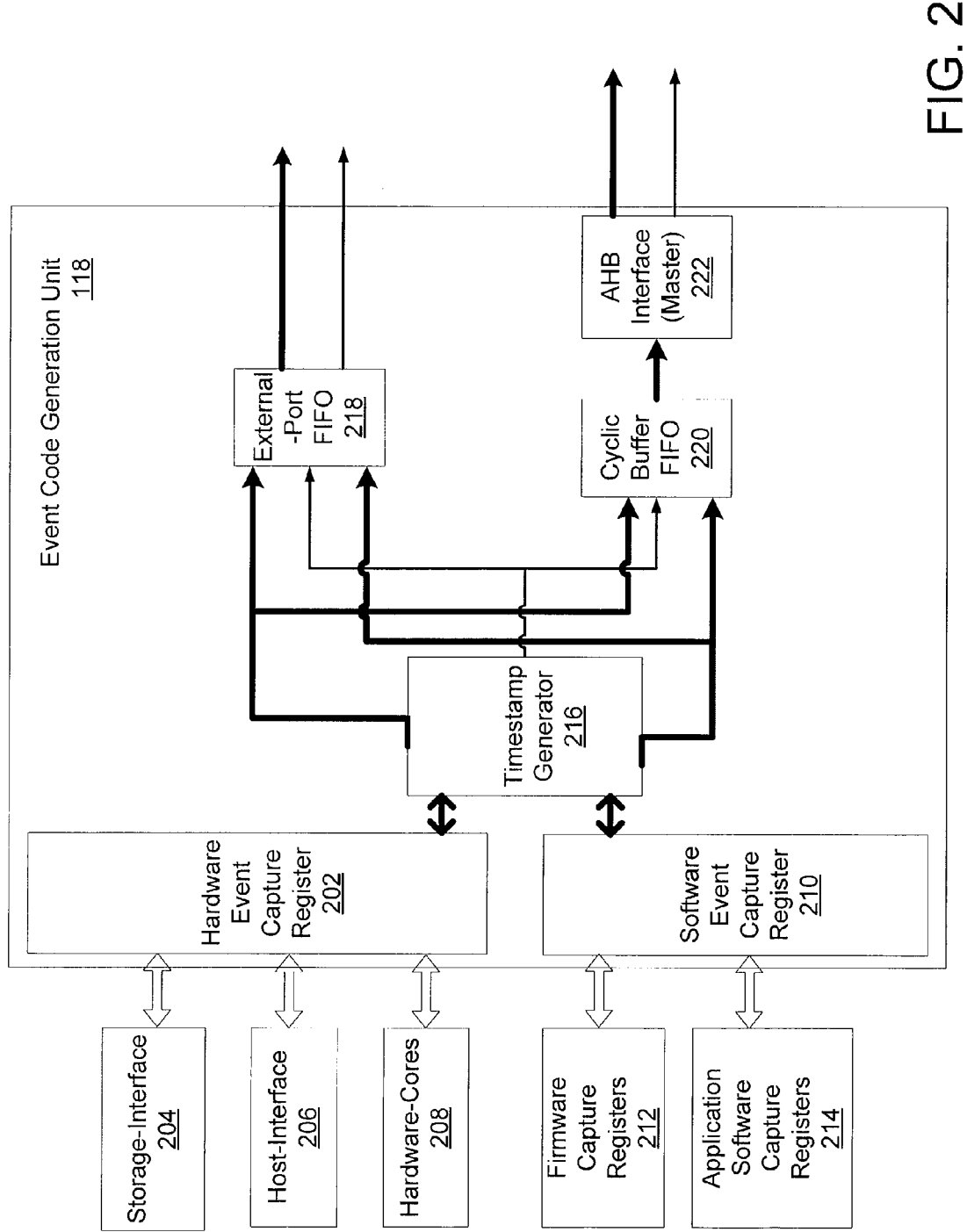
FIG. 2 is a block diagram of an example event code generation unit that may be implemented in device of FIG. 1.

FIG. 2 is a block diagram of an example event code generation unit 118 that may generate event codes in response to receiving asynchronous and periodic events. Hardware event capture register 202 may receive events from several hardware sources including storage interface 204, host-interface 206 and hardware cores 208. Storage interface 204 may correspond to the hardware interface between mass storage memory 116 and processor 110 of FIG. 1. Host interface 206 may correspond to hardware used to interface a processor with device hardware components such as the interface between processor 110 and RAM 114, for example. Hardware core 208 may store events generated during the operation of CPU cores 110-1 and 110-2 of processor 110, for example.

Software event capture register 210 may be configured to receive asynchronous events from firmware sources including firmware capture registers 212 and application software capture registers 214. Firmware capture registers 212 may receive events generated by firmware 104 of FIG. 1 for example. Application software capture registers 214 may receive events generated by applications 108-1 . . . 108-N, operating system 106 etc. Timestamp generator 216 may receive events from hardware event capture register 202 and software event capture register 510. In response to receiving events, timestamp generator 516 may generate timestamp offsets and corresponding event codes. As previously discussed the generated event codes may include identifiers corresponding to the events received at hardware event capture register 202 and software event capture register 210 and associated timestamp offsets. Separately, timestamp generator 216 may also generate periodic events code based on internally generated periodic events. The periodic event codes may include an identifier that event tracing unit 126 of FIG. 1 may recognize as a periodic event. The periodic event codes may or may not include timestamp offsets. The event codes generated by timestamp generator 516 may correspond to event codes later discussed with reference to FIGS. 4A and 4B.

In some embodiments described in greater detail below, each or some of the firmware capture registers 212, application software capture registers 214, storage interface 204, host-interface 206 and hardware cores 208 may include additional logic elements that may generate the asynchronous events based on events received from their respective sources. For example, asynchronous events generated by application software capture registers 214 in response to receiving an event from application 108-1 of FIG. 1 may include an identifier corresponding to the application 108-1. As another example, in a device with multiple host interfaces, asynchronous events generated by host-interface 206 may include an identifier of the interface that generated the event. It will be evident to a person of ordinary skill in the art of hardware and firmware design that embodiments discussed herein may be similarly extended to devices with different hardware and firmware architectures.

The generated event codes may be transmitted via external first in first out (FIFO) port 218. Separately, the generated event codes may be stored in cyclic buffer FIFO 220. A high speed bus master like advanced high-performance bus (AHB) master 222 may transmit the generated event codes. An event tracing unit 126 may receive the event codes via either a bus connected to external FIFO port 218 or via a bus configured to operate in accordance with the protocol used by AHB master 222. While the event code generating unit 118 may be a hardware module such as an application specific integrated circuit (ASIC) or other integrated circuit as described above, in other embodiments it is contemplated that it may be implemented in firmware with a dedicated or shared processor.

Figure 3:
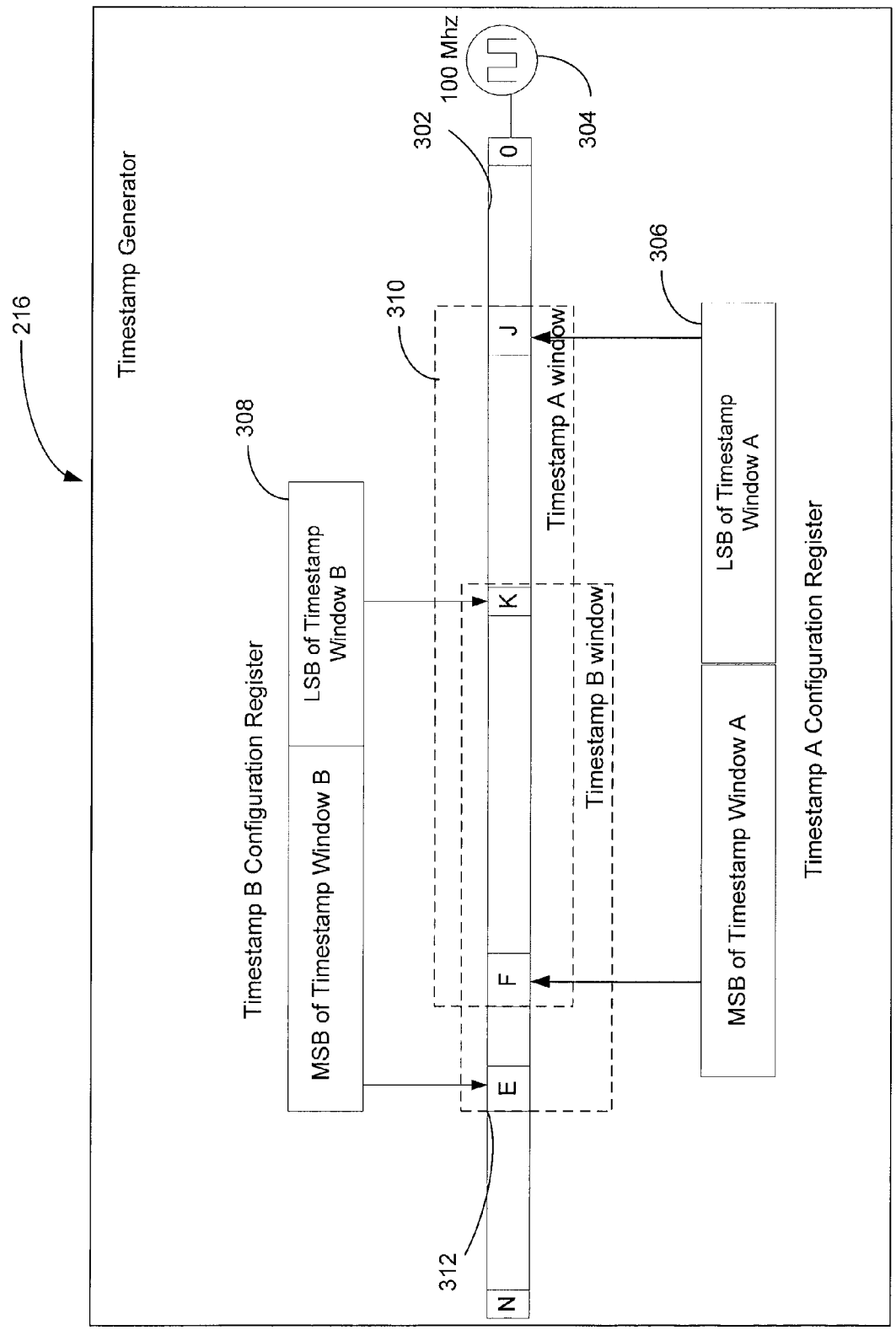
FIG. 3 is a block diagram of an example timestamp generator that may be implemented in the event code generation unit depicted in FIGS. 1 and 2.

FIG. 3 is a block diagram of an example timestamp generator 216 that may be implemented in event code generation unit 118 to generate, in response to receiving asynchronous events, event codes that include timestamp offsets or fractions. In this example, timestamp A configuration register 306 and timestamp B configuration register 308 in conjunction with hardware timer/counter 302 may generate periodic events at two different rates and timestamp fractions or offsets having different resolutions. Timestamp configuration registers 306 and 308 may be used to specify the precision to be used when calculating timestamp offsets for events received from sources having different minimum inter-event spacing. Separately, timestamp configuration registers 306 and 308 may be used to specify the frequency or the rate at which periodic events are to be generated. Timestamp configuration registers 306 and 308 may be configured when device 100 is powered-on. In other embodiments, a user may communicate with device 100 via communication module 120 to dynamically configure timestamp configuration registers 306 and 308. In still other embodiments, event tracing unit 126 may timestamp configuration registers 306 and 308.

Hardware timer/counter 302 may receive a clock signal 304 which causes it to count up with each clock pulse. In the example of FIG. 3, clock 304 is configured to generate a continuous series of pulses at a fixed rate. In this example clock 304 generates $1 \times 10^6$ or 1 million pulses per second. Stated differently, clock 304 generates a pulse very 1 microsecond (μsec). A person having ordinary skill in the art of hardware design will recognize this as a clock signal with a frequency of 1 Megahertz (1 MHz) or $10^6$ Hz. Hardware timer/counter 302 has N-bits, where N is an integer and corresponds to the width or the number of bits that make up the counter. The value of counter 302 is incremented by one (1) for each pulse received from clock 302. When the value in counter 302 is incremented to the maximum value i.e. $2^N$, counter 302 is reset to 0 and the process is repeated (rollover). As an example if N is 32 bits, for each clock pulse generated by clock 304, counter 302 increments by 1 until counter 302 reaches a count corresponding to $2^{32}$ or 4294967296. Because in this example, a clock pulse is generated every 1 μsec, hardware timer/counter 302 rolls over after receiving 4294967295 clock pulses or every 4294967296*1 μsec.

Each timestamp configuration register 306 and 308 defines a respective timestamp fraction window 310 and 312. The most significant bit (MSB) of a timestamp configuration register controls the periodicity of the periodic event generated and the least significant bit (LSB) of the timestamp configuration register determines the resolution of the timestamp offset or fraction. The MSB corresponds to a respective bit position in hardware timer/counter 302. A periodic event is generated each time a bit in hardware timer 302 corresponding to the MSB of either of timestamp configuration registers A 306 or B 308 transitions from '0' to '1' or '1' to '0.' Thus, periodic events will be generated at a fixed rate determined by the relative position of the MSB. In this example, because MSB of timestamp configuration register B 308 is of a higher order than MSB of configuration register A, periodic events based on configuration register B will be generated more infrequently than periodic events based on configuration register A. Stated differently, the time duration between two consecutive periodic events generated based on timestamp configuration register B 308 will be greater than the time duration between two consecutive periodic events generated based on timestamp configuration register A 306.

As an example, if MSB of timestamp configuration registers A 306 corresponds to bit 12 (F) of hardware counter/timer 302 is set, a periodic event is generated every $2^{11}$ or 2048 clock pulses received by hardware timer/counter 302. Thus, in the case of a 1 MHz clock signal where a pulse is generated every 1 μsec by clock 304, a periodic event may be generated every 2048 μsec. In contrast, MSB of timestamp configuration registers B 308 corresponding to bit 20 (E) of hardware counter/timer 302 is set, a periodic event is generated every $2^{19}$ or 524288 clock pulses received by hardware timer/counter 302 or every 524288 μsec (approximately every 524 msec). Thus, by configuring the appropriate MSB, periodic events may be generated at a configurable rate. Generally if MSB of timestamp configuration registers A 306 or B 308 corresponds to bit 'n' is set in hardware timer/counter 302 and clock 304 has a frequency of 'f' in hertz, a periodic event will be generated in accordance with Equation 1.

$$\text{Event period} = \frac{2^{(n-1)}}{f_{Hz}} \quad \text{Equation 1}$$

In response to receiving a periodic event timestamp generator 216 may generate a periodic event code that includes an identifier that indicates that the event code corresponds to a periodic event. In some embodiments, timestamp generator 216 may include information in the periodic event code. Information may comprise run-time status of the device 100 including the program counter of processor 110, status of CPU cores 110-1 and 110-2, stack pointer, free memory space etc.

In some embodiments, asynchronous events generated from one source may be generated at a first maximum rate and asynchronous events generated by another may be generated at a slower second maximum rate. Generally, the maximum rate corresponds to the minimal inter-event spacing for events received from a particular source. In the discussion that follows, asynchronous events received from one or more sources having a common maximum rate may be referred to a set of events. For example, with reference to FIG. 2, events received from hardware event capture register 202 may be received a first maximum rate and may constitute one set of asynchronous events and events received from software event capture register 210 may be received at slower second maximum rate and may constitute one set of asynchronous events. As another example, events may be generated by hardware platform 102 (FIG. 1) at a rate faster than the rate at which events are generated by firmware 104, operating system 106 and applications 108 (software events). In other words, the minimum inter-event spacing for software events is greater than the minimum inter-event spacing for events generated by hardware platform 102. Consequently, timestamp generator 216 may generate lower precision timestamp fractions or offsets when software events are received. Lower precision timestamp fractions may be generated by disregarding lower order bits of hardware timer/counter 302. The LSB of timestamp configuration registers 306 and 308 may be used to specify/configure the precision of the timestamp offsets. The LSB and MSB of timestamp configuration register A 306 and timestamp configuration register B 308 define respective timestamp fraction window frames 310 and 312 which may be used as bit masks to generate timestamp fractions based on hardware timer/counter 302.

With reference to FIGS. 2 and 3, in response to receiving events from hardware event capture register 202, timestamp generator 216 may generate a timestamp offset or fraction based on timestamp configuration register A 306 and corresponding timestamp fraction window frames 310 and in response to receiving events from software event capture register 210, timestamp generator 216 may generate a timestamp offset or fraction based on timestamp B configuration register 308 and corresponding timestamp fraction window frames 312. To generate a timestamp fraction in response to receiving an event from hardware event capture register 202, for example, timestamp generator 216 may record the setting of the bits in the hardware timer/counter 302 corresponding to the bits between the MSB and LSB including the LSB of timestamp configuration register A 306. Similarly, to generate a timestamp fraction in response to receiving an event from software event capture register 202, for example, timestamp generator 216 may record the setting of the bits in the hardware timer/counter 302 corresponding to the bits between and including the MSB and LSB of timestamp configuration register B 308. In this embodiment, the generated timestamp fraction corresponds to the time elapsed since the last generated periodic event.

Timestamp generator 216 may generate an asynchronous event code by concatenating an identifier corresponding to a generated asynchronous event and the determined timestamp fraction.

The generated event codes and periodic event codes may be transmitted to the event tracing unit 126 via test port 121, in an embodiment. In another embodiment, the generated event code may be stored in cyclic buffer, 114-1 of FIG. 1 for example. In this embodiment, the event codes may be transmitted to event tracing unit 126 by a bus controller via a high speed bus (not shown). Event tracing unit 126 may reconstruct a different timescale for each of the sources of asynchronous on a single unified scale, which can be then combined with the timescales of other asynchronous sources that derive from the same timestamp despite the fact that the precisions of these timescales may be absolutely different. As previously explained, the precision selected corresponds to the maximum rate at which the source may generate events. More specifically, this provides for performing better analysis/profiling of the system flow by focusing on a specific timescale view of events coming in from a specific source; or by focusing on a combination of timescale views of events coming in from several different sources; or on all the events of all multiple sources on the same timescale view.

Figure 4A:
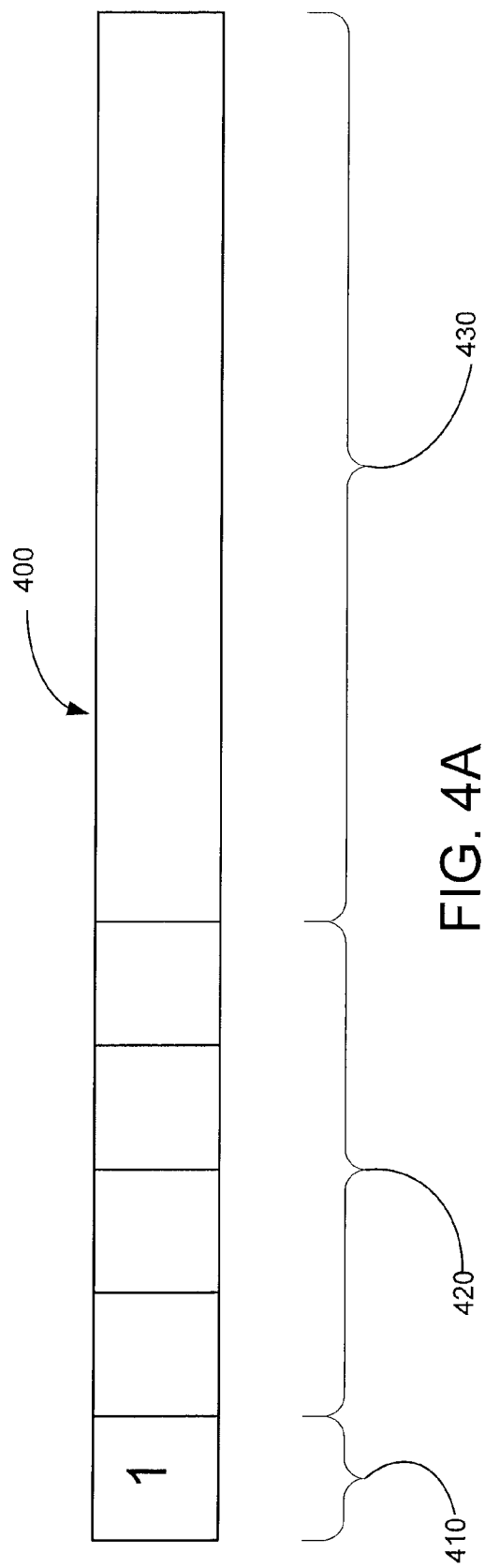
FIGS. 4A and 4B are example event codes generated by an example event code generation unit.
Figure 4B:
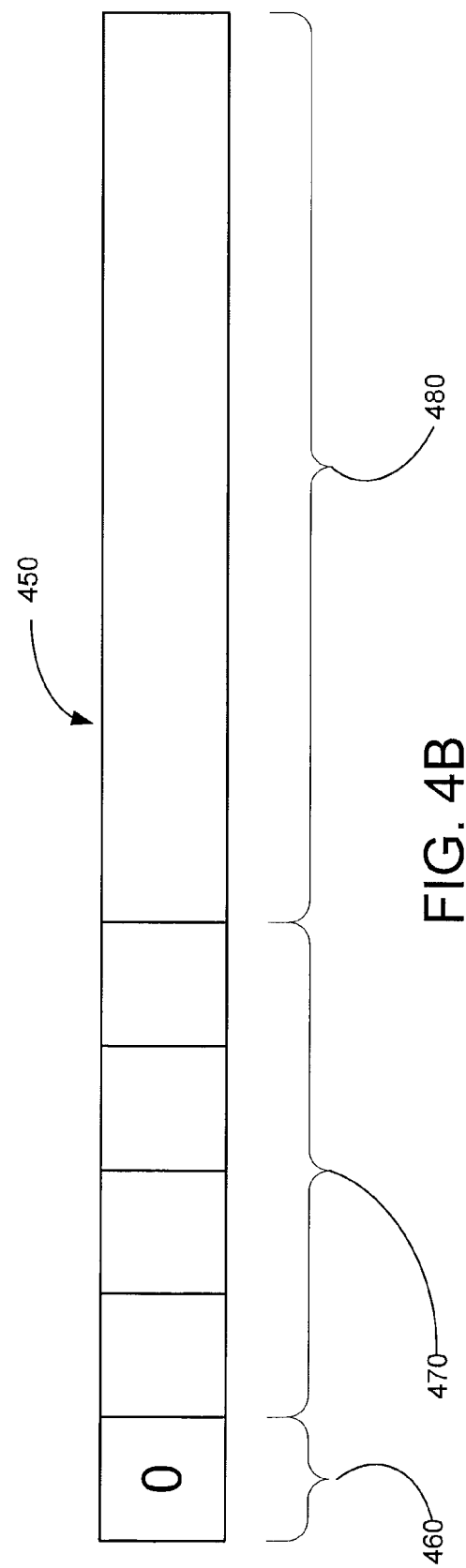

FIGS. 4A and 4B illustrate example event codes generated by event code generation unit 118 of FIG. 1. By way of example and without limitation, event codes 400 and 450 consist of 32 bits. In this example, event code 400 corresponds to an event code generated by timestamp generator 216 in response to receiving an asynchronous event. As previously discussed, timestamp generator 216 generates a timestamp fraction in response to receiving an indication that an event was stored in hardware event capture register 202 or software event capture register 210, in an embodiment. Referring to FIG. 4A, timestamp generator 216 set most significant bit (MSB) 410 to '1' to indicate that the remaining information in event code 400 corresponds to an asynchronous event code. Bits 420 may correspond to the event stored in hardware event capture register 202 or software event capture register 210. Bits 420 may be set to one of a first set of values if an event is received from hardware event capture register 202 and one of second set of values if an event is received from software event capture register 210. As an example, if bits 420 occupy 7 bits of event code 400, values 0 to 63 (binary 0 to 111111) may represent the value of an event generated by hardware platform 102 and stored in hardware event capture register 202 and values 64 to 127 (binary 1000000 to 1111111) may represent the value of an event generated by software and stored in software event capture register 210. Other schemes of apportioning values stored in bits 420 may be conceived depending on the requirements of the system. An event tracing unit 126 may decode the values stored in bits 420 to identify the type of event and the source of the event. Bits 430 correspond to the timestamp fraction generated by timestamp generator 216.

Timestamp generator 216 may generate event code 450 in response to a periodic event. Timestamp generator 216 may set most significant bit (MSB) 460 to '0' to indicate that event code 450 was generated in response to a periodic event. In an embodiment, bits 470 may be utilized to indicate the periodicity of the generated periodic event code. As previously discussed, in some embodiments periodic events may be generated at different rates. For example, in an embodiment periodic events may be generated every 1 μsec and every 1 msec. In this embodiment, a value of decimal 1 (binary 01) stored in bits 470 may indicate that the particular periodic event has a periodicity of 1 μsec and a value of decimal 2 (binary 10) stored in bits 470 may indicate that the particular periodic event has a periodicity of 1 msec. Bits 480 may be utilized to store status information of device 100. A portion of the bits 480 may be utilized to indicate the type of status information stored in the remaining portion of the bits 480, in an embodiment. In an embodiment, event tracing unit 126 may examine bit most significant bit (MSB) 410 or 460 of a received event code to determine if the received event code corresponds to a periodic event or an asynchronous event. If MSB is '1,' in this embodiment, event tracing unit 126 may conclude that the received event code corresponds to an asynchronous event and if MSB is '0', event tracing unit 126 may conclude that the received event code corresponds to a periodic event. Other schemes to distinguish between an asynchronous event code and a periodic event code may be conceived.

FIG. 5 is a block diagram of an example event tracing unit 500. Event tracing unit 500 may correspond to event tracing unit 126 of FIG. 1. Event tracing unit 500 may be coupled to device 100 of FIG. 1 via communication controller 502. In this example, communication interface 502 may include special purpose circuitry, such as an ASIC, and firmware that implements communications protocols that may be used by device 100 to communicate event codes. As an example, if the communication controller 502 corresponds to a USB port, communication controller 502 may include the appropriate circuitry and firmware to decode the USB protocol and recover the event codes transmitted by device 100. Communication controller 502 may store the recovered event codes in buffer 504. Buffer 504 may correspond to a circular or ring buffer. Accordingly, communication controller 502 may store event codes in consecutive memory locations and when communication controller 502 encounters the last memory location of buffer 504, communication controller 502 may "loop back" and store the next event code in the first location of buffer 504.

Event code decoder 506 is adapted to receive an indication from communication controller 502 when communication controller 502 stores an event code in buffer 504, in an embodiment. In this embodiment, communication controller 502 may generate an interrupt when an event code is stored in buffer 504. Communication controller 504 may also provide event code decoder 506 with a reference to a memory location in buffer 504 where the event code is stored. Event code decoder 506 may retrieve the event code from buffer 504. Based on information/data contained in the event retrieved event code, event code decoder 506 may determine if the event code corresponds to a periodic event or an asynchronous event.

With reference to FIGS. 4A and 4B, event code decoder 506 may examine MSB of the event code to determine if the event code corresponds to a periodic event or an asynchronous event. For example, if the MSB is set, event code decoder 506 may conclude that the event code corresponds to a periodic event. In response to determining that the event code corresponds to a periodic event, event code decoder 506 may instruct periodic event accumulator 508 to increment a count corresponding to the number of periodic events received by the event tracing unit 500. Separately, event code decoder 506 may extract status information stored in bits 480 of event code illustrated in FIG. 4B. Event code decoder 506 may instruct event time calculator 510 to calculate the time at which a periodic event was generated. In an embodiment, event time calculator 510 may retrieve a count of the number of periodic events stored in periodic event accumulator 508 and multiply the count by a periodic event rate. The result corresponds to a time when the periodic event was generated (the periodic event timestamp). Event tracing unit 500 may be configured with the periodic event rate, in an embodiment. The periodic event rate corresponds to the rate at which the periodic events are generated by event code generation unit 118, in an embodiment. In another embodiment, device 100 may communicate the periodic event rate when event tracing unit 500 is coupled to device 100. In yet other embodiments, as previously discussed, bits 470 of event code 450 may be utilized to indicate the periodicity of the periodic events.

In response to detecting that a received event code corresponds to an asynchronous event, event code decoder 506 may identify the asynchronous event and/or its source based on information in the event code. Separately, event code decoder 506 may retrieve a timestamp fraction from the event code. Event code decoder 506 may instruct event time calculator 510 to generate a timestamp when the asynchronous event was generated in the device 100, for example.

To generate the time, event time calculator 510 may retrieve the count of the previously received periodic events stored in periodic event accumulator 508 and multiply the count by the periodic event rate. Additionally, event time calculator 510 may add the timestamp offset to the product of the count of the previously received periodic events and periodic event rate to generate a timestamp for the asynchronous event. Event tracing unit 500 may display periodic events and their corresponding timestamps at display 512. In an embodiment, event tracing unit 500 may also display the corresponding status information extracted from a periodic event code.

Event tracing unit 500 may also display an identifier corresponding to a received asynchronous event code, its source and/or its corresponding timestamp at display 512.

Figure 6:
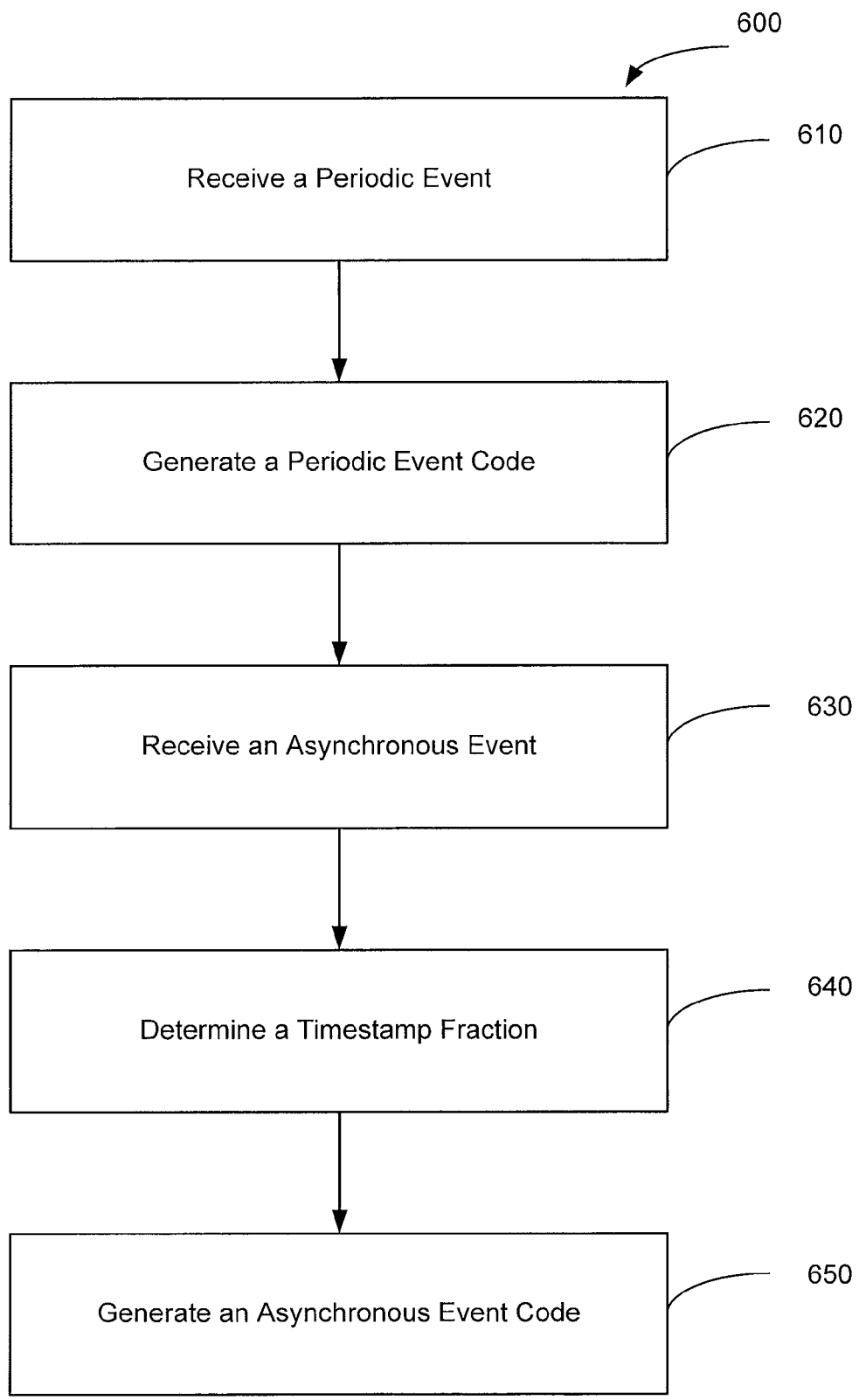
FIG. 6 is a flow diagram of an example method that may be implemented in an example event code generation unit to generate event codes.

FIG. 6 is a flow diagram of an example method 600 that may be implemented in device 100 of FIG. 1, for example, to generate asynchronous and periodic event codes. At block 610, a periodic event may be received. A periodic event may be generated by utilizing the scheme discussed with reference to FIG. 3. At block 620, a periodic event code may be generated. The periodic event code may be generated by timestamp generator 216 of FIG. 3 and have a format discussed with respect to periodic event code 450 of FIG. 4B. At block 620, the periodic event code may also be generated to include information corresponding to the previously discussed status of device 100.

At block 630, an asynchronous event may be received. The asynchronous event may be received from hardware event capture register 202 or software event capture register 210 in an embodiment. As previously discussed based on the source and identity of the asynchronous event, at block 630 a corresponding event code identifier may be generated.

At block 640, timestamp generator 216 may generate a timestamp fraction or offset. To generate a timestamp fraction or offset, at block 640, timestamp generator 216 may select one of timestamp configuration registers A 306 or B 308 based on the source of the asynchronous event. Timestamp generator may capture the state of the bits of hardware counter/timer 302 corresponding to the bits between the MSB and LSB of the selected timestamp configuration register.

At block 650, timestamp generator 216, for example, may generate an asynchronous event code by concatenating the event code identifier generated at block 630 with the timestamp fraction generated at block 640. The generated asynchronous event code may have a format corresponding to event code 400 illustrated and described in and with reference to FIG. 4.

Figure 7:
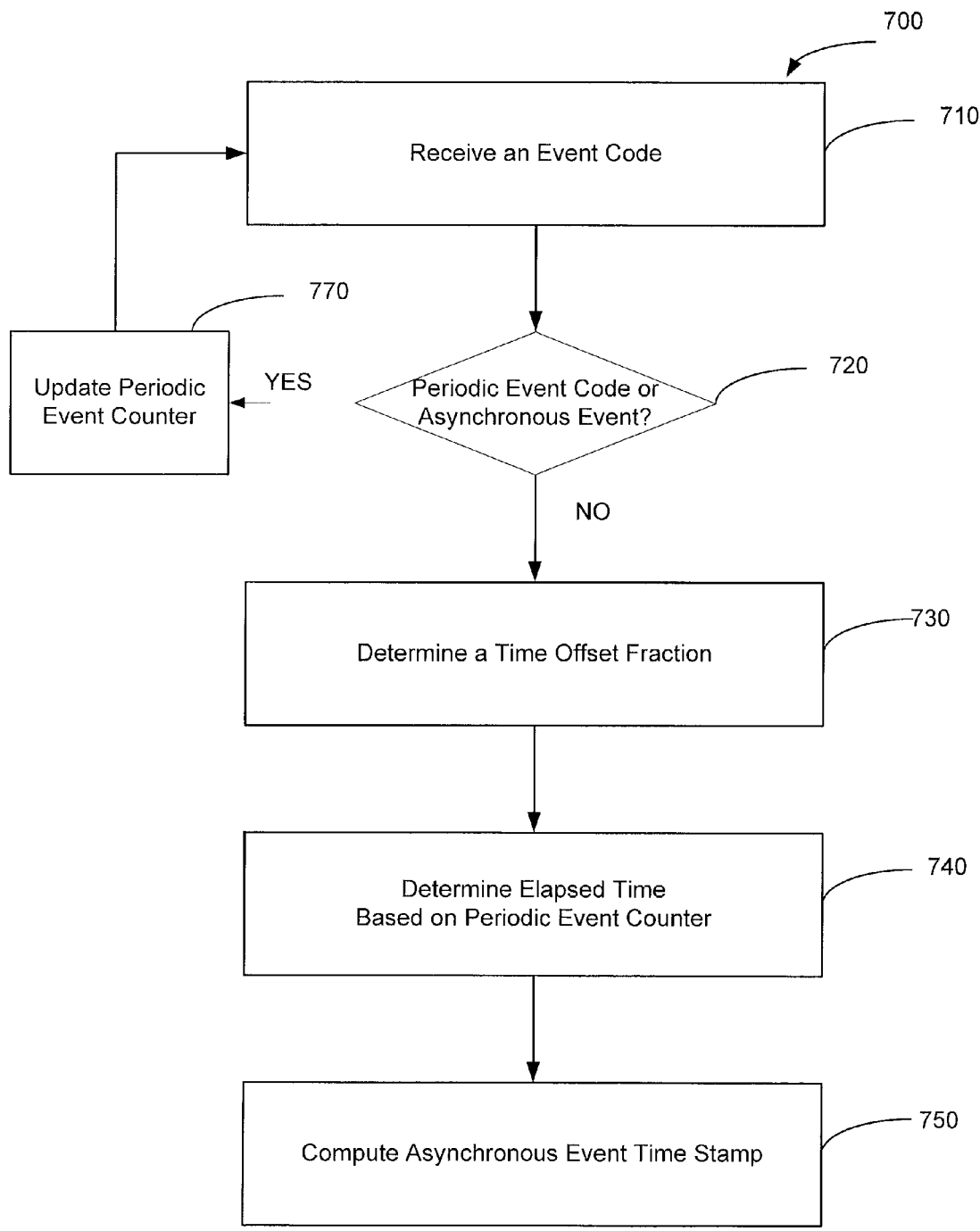
FIG. 7 is a flow diagram of an example method that may be implemented in an example event tracing unit to receive and decode event codes generated by an event code generation unit.

FIG. 7 is a flow diagram of an example method 700 that may implemented at event tracing unit 126 of FIG. 1. By way of example and without limitation, method 700 is discussed with reference to elements of the example block diagram of event tracing unit 126 illustrated in FIG. 5. However, method 700 may be implemented in a standalone computer in an embodiment. In this embodiment, the processor may execute software instructions and control hardware components to generate a time stamped event based on received event codes.

At block 710, event tracing unit 126 may receive an event code. The event code may be generated by event code generation unit 118 of FIG. 1. The event code may correspond to a periodic event code or an asynchronous event code. In an embodiment, the asynchronous event code may include a timestamp offset. Portions of block 710 may be implemented at communication controller 502 in an embodiment. The received event code may be stored in buffer 504.

At block 720, the event code may be decoded or analyzed. The analysis may be performed at event code decoder 506. At block 720, the event code may be retrieved from buffer 504. Referring to FIGS. 4A and 4B, at block 720 bits corresponding to 410 or 460 may be examined to determine if the event code corresponds to a periodic event code or an asynchronous event code. If it is determined that the event code corresponds to a periodic event code, at block 720 periodic event accumulator 508 may be incremented to track the count of received periodic event codes. In scenarios, where periodic events are generated at two or more rates, in response to determining that a periodic event was received, at block 720 other bits may be examined to identify the periodicity of the periodic event code. A counter or tracker or register corresponding to the identified periodicity may be updated in periodic event accumulator 508 in this scenario.

Software instructions may be invoked or hardware elements may be activated at block 730 in response to detecting at block 720 that a received event code corresponds to an asynchronous event. At block 730, a timestamp fraction may be extracted from the received asynchronous event code. Separately, in scenarios where sets of asynchronous events are generated at two or more different maximum rates, at block 730, a determination of which set the received asynchronous event code corresponds to be may be made. Additionally, an identifier corresponding to the asynchronous event code may be stored.

In response to determining the timestamp fraction, at block 740, an elapsed time may be calculated based on the count of periodic events in the periodic event accumulator. For example, if N periodic events were previously received and the periodic events have a periodicity or rate of M, at block 740 (M×N) may be computed. In scenarios where periodic events are generated at two or more different rates and corresponding sets of asynchronous events are generated at two or more maximum event rates, the accumulated count of periodic events that correspond to the maximum rate of the asynchronous event code detected at block 730 will be used. For example, if periodic events are generated at 1 msec and 10 msec and the asynchronous event code detected at block 730 corresponds to an asynchronous event whose source generates asynchronous events at a maximum rate of 10 msec, the accumulated count of periodic events generated at the rate of 10 msec may be utilized at block 740 to calculate an elapsed time. If 100 periodic events generated at a rate of 10 msec have been accumulated, the elapsed time would correspond to 100*10 msec or 1 second.

At block 750, the timestamp for the asynchronous event detected at block 730 may be computed based on the elapsed time computed at block 740 and the timestamp fraction identified at block 730. Referring to the previous example, if the timestamp offset is 4 msec, the timestamp may be calculated as being 1000 msec+4 msec or 1004 msec. Before displaying the event on display 512, the timestamp may be rationalized to the timescale of the set of asynchronous events that are generated with the smallest maximum rate to generate a unified time scale.

Figure 8:
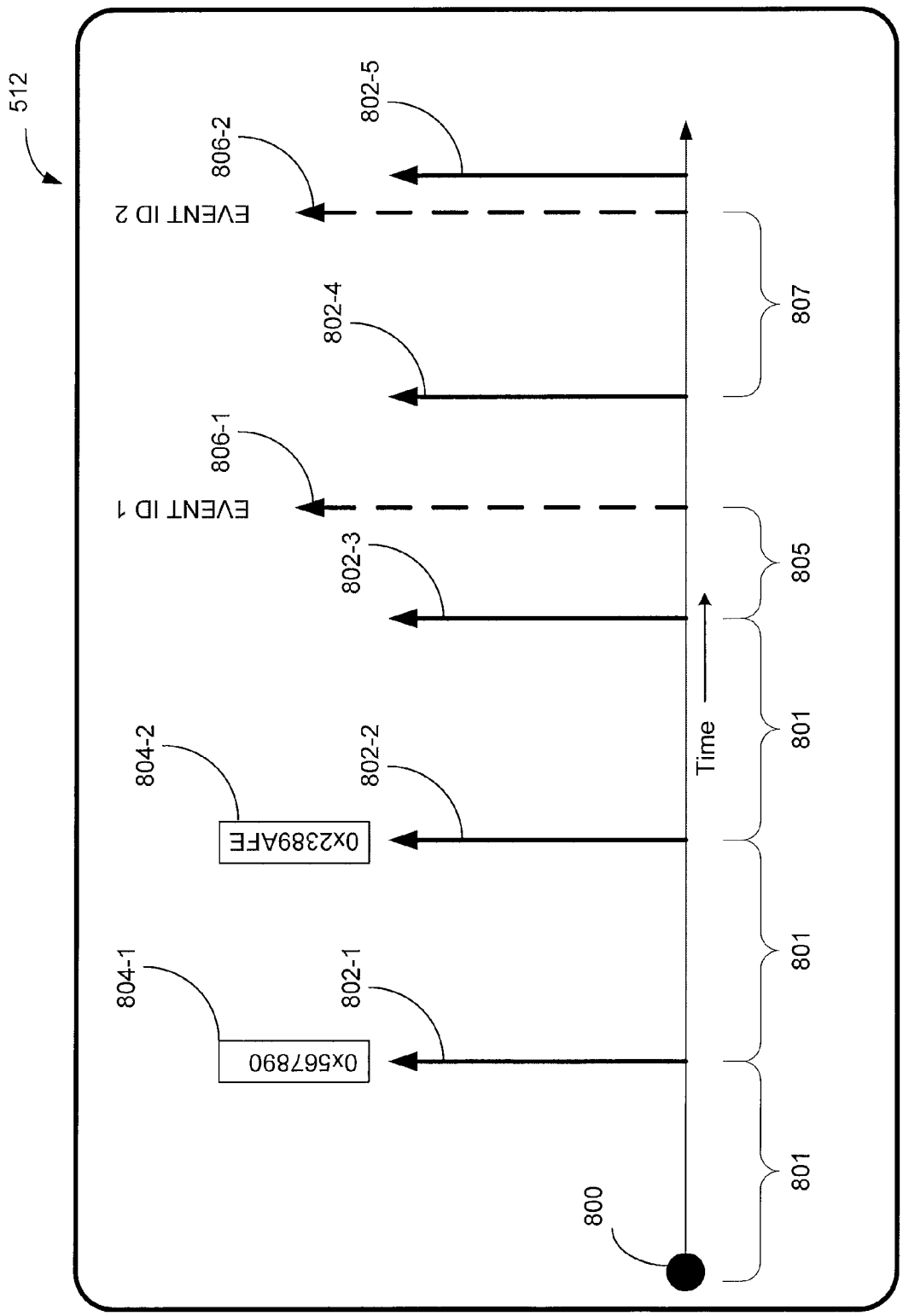
FIG. 8 is a timing diagram generated by event tracing unit in response to receiving periodic events codes and asynchronous event codes from device of FIG. 1 and generated by event code generation unit.

FIG. 8 is an example illustration of periodic events and asynchronous events decoded by event tracing unit 126 and displayed at display 512. In this example, the solid lines 802-1 . . . 802-5, correspond to sequentially received, periodic events that may be generated by event code generation unit 118. Event tracing unit 126 may identify the periodic events based on detecting identifiers in received periodic event codes, for example 450 of FIG. 4B. For example, referring to FIG. 4B, event tracing unit 126 may make a determination that received events codes correspond to periodic events based on detecting bit 460 as being set. As previously explained with reference to FIG. 5, in response to detecting periodic events 802-1 . . . 802-5, event tracing unit 126 may increment a counter in periodic event accumulator 508.

Data 804-1 and 804-2 correspond to status information of device 100, for example, that may be received with periodic event codes corresponding to events 802-1 and 802-2, respectively. As previously explained, based on identifying periodic codes, event tracing unit 126 may discern the inter-periodic event time separation or rate 801.

Events 806-1 and 806-2 correspond to asynchronous events that may be decoded by event code decoder 506 of event tracing unit 126 based on receiving two event codes.

Event tracing unit 126 may retrieve timestamp offset 805 from the event code corresponding to event 806-1. Timestamp offset 805 may be generated by timestamp generator 216, for example, and may represent the elapsed time after periodic event 802-3. Similarly, event tracing unit 126 may retrieve timestamp offset 807 from the event code corresponding to event 806-2. Timestamp offset 807 also generated by timestamp generator 216 may represent the elapsed time after periodic event 802-4.

Event time calculator 510 of event tracing unit 126 may calculate an absolute timestamp for asynchronous event 806-1 from start time 800 as the sum of three inter-periodic events time period 801 and timestamp offset 805. Similarly, Event time calculator 510 of event tracing unit 126 may calculate an absolute timestamp for asynchronous event 806-1 from start time 800 as the sum of four inter-periodic events time periods 801 and timestamp offset 807.

As discussed with reference to FIG. 1, the device 100 may include a multi-threaded OS 106. Generally, in the context of a multi-threaded OS, one or more threads may be executed in parallel by processor 110. A thread is a basic unit to which scheduler 122 of multi-threaded OS 106 allocates processor time. A thread can execute any part of the software instructions in applications 108-1 . . . 108-N and firmware 104, including software instructions currently being executed by another thread. Frequently, CPU cores 110-1 and 110-2 may execute the same thread at different points in time. Frequently threads execute one or more common software routines or instructions. For example, threads may execute the same software instructions to write to flash memory, or transmit a data packet etc.

Distinguishing between which of the different threads and CPU cores executed a common instruction that generated an event is not a trivial matter.

Figure 9:
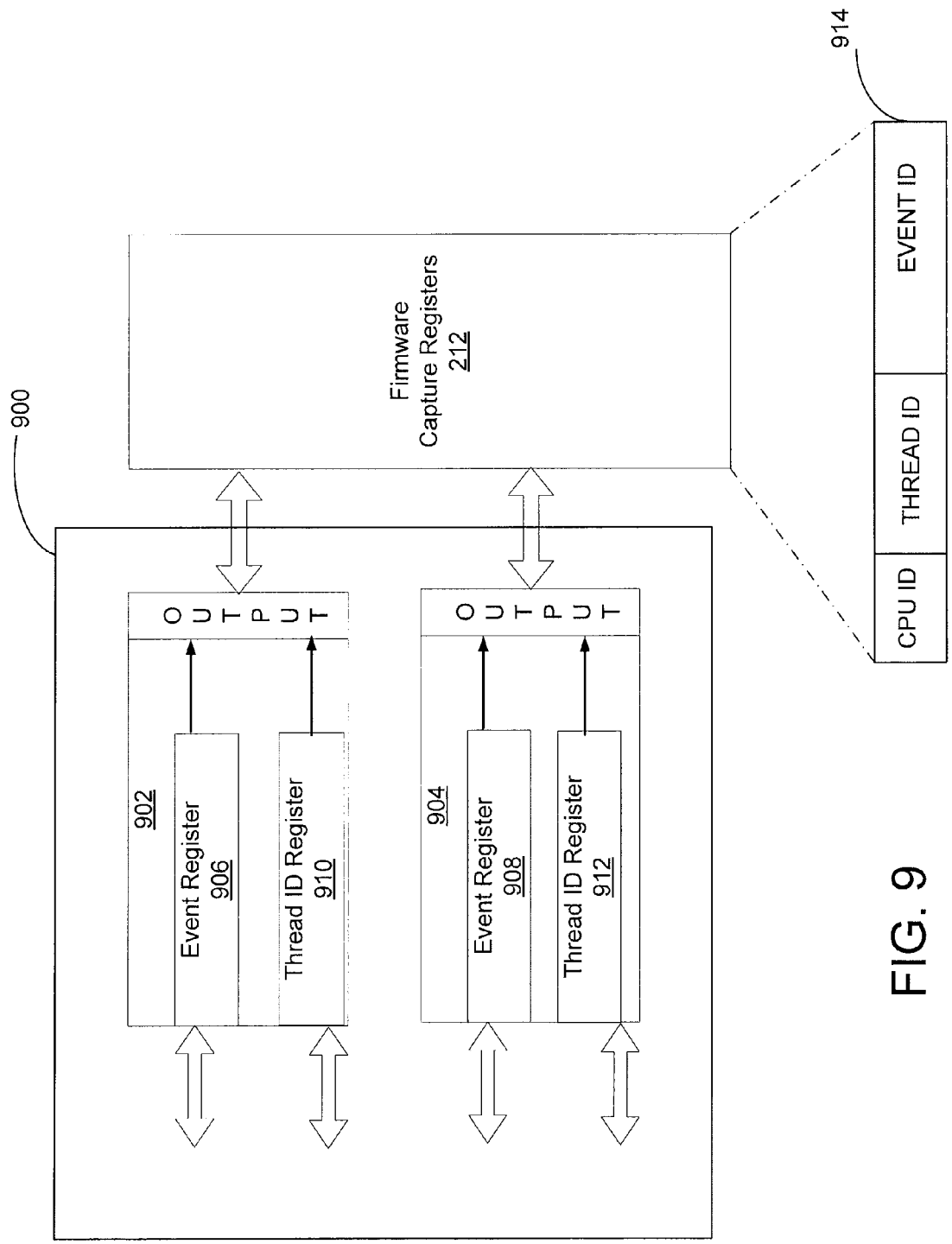
FIG. 9 is a block diagram of an example event generator that generates events received from multiple sources.

Referring to FIG. 2 and FIG. 9, in an embodiment, firmware capture registers 212 may be adapted to receive events from hardware logic element 900. In this embodiment, each CPU core 110-1 and 110-2 may be associated with hardware logic registers 902 and 904 respectively.

In this embodiment, based on which CPU core 110-1 or 110-2 requests execution of a thread, scheduler 122 of OS 106 stores a thread ID into corresponding Thread ID register 910 or 912. For example, if CPU core 110-2 requests scheduler 122 to execute a thread corresponding to thread ID "0×10," scheduler 122 stores "0×10" in Thread ID register 912 when scheduler 122 switches execution to the thread corresponding to thread ID "0×10." While thread corresponding to thread ID "0x10" is executing all generated events will be stored in event register 908.

Each time a generated event is stored in event register 910 or 912, firmware event capture register 212 may receive an indication in the form of an identifier for the event and the thread that is the source of the event. The indication may identify which one of hardware logic registers 902 and 904 were written to. In this embodiment, logic in firmware event capture register 212 may retrieve thread ID and the event from thread ID register and event register corresponding to the hardware logic register that was written to. With reference to the example discussed in the preceding paragraph, when thread corresponding to thread ID "0×10" being executed by CPU core 110-2 stores an event in event register 912, logic in firmware event capture register 212 may retrieve the event from event register 910 and concatenate the event with the thread ID retrieved from thread ID register 908. The concatenated event and thread ID is referred to as the concatenated event identifier. In some embodiments, logic in firmware event capture register 212 may also concatenate an identification of the particular CPU core that was executing the thread.

Event 914 depicted in FIG. 9 corresponds to the layout of an example concatenated event identifier that may be generated by logic in firmware event capture register 212 in response to being notified that a thread id and an event are written to the registers of either hardware logic registers 902 or 904.

The resulting concatenated event identifier may ultimately be received by timestamp generator 216 of event code generation unit 118 of FIG. 1 which may generate a corresponding time stamped event code that includes depending on the embodiment a timestamp or a timestamp fraction offset using previously explained schemes. Referring to both FIGS. 4A and 9, event 914 may correspond to bits 420 of event code 400, in an embodiment. The generated event code may be transmitted or communicated to event tracing unit 126. An event tracing unit 126 on receiving the event code may process the event code to extract the thread ID and the CPU core that generated the event. An event generated by the execution of a common set of instructions may be associated with the thread and CPU that executed the common set of instructions. This provides an additional level of debug and analysis in a device with multiple CPU cores that executes a multi-threading operating system.

In the embodiments described above, debug and runtime events generated by a device may be efficiently communicated to a remote event tracing unit for analysis. Generating periodic events that include device information permit the developers of the device a means to receive critical system information in near real-time based on the periodicity of the periodic events. Another advantage of the periodic events is that it implicitly produces a time scale that can be reconstructed by an event tracing unit. Separately, generating asynchronous event codes that include only a timestamp fraction instead of a complete timestamp permit the generation of compact time stamped event codes. Because a timestamp fraction associated with an asynchronous event code corresponds to a time difference between a previously received periodic event and the asynchronous event, the difference may be represented in lesser bits than the corresponding explicit time stamp for the asynchronous event that is related to the time when the device was powered up. For example, if an asynchronous event was generated 24 hours after the device was powered up and 1 minute after a periodic event, representing 24 hours in seconds (hex. 15180) occupies more bits than representing 1 minute in seconds (hex. 3C). This is particularly useful because it permits memory efficient storage of events code. Moreover, because the time stamped event codes are compact, their transmission over a serial or parallel bus from device 100 to event tracing unit 126 for example, consumes less transmission bandwidth. Still another feature disclosed allows the inclusion of an identifier of the source of the asynchronous events.

Embodiments discussed above may be implemented exclusively in hardware or firmware or in any combination thereof. Additionally, in embodiments where hardware is utilized, the hardware may include field programmable gate arrays (FPGAs), application specification integrated circuits (ASICs), general purpose digital logic or any combination thereof. Separately, where firmware or software is utilized to implement the embodiments discussed herein, machine instructions corresponding to the firmware or software may be stored in a suitable non-transitory storage medium that may be read by a processor.

Each of the methods described herein may be encoded in a computer-readable storage medium (e.g., a computer memory), programmed within a device (e.g., one or more circuits or processors), or may be processed by a controller or a computer. If the processes are performed by software, the software may reside in a local or distributed memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable storage medium," "machine-readable medium," "propagated-signal" medium, and/or "signal-bearing medium" may comprise a medium (e.g., a non-transitory medium) that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a computer and/or machine memory.

While various embodiments, features, and benefits of the present system have been described, it will be apparent to those of ordinary skill in the art that many more embodiments, features, and benefits are possible within the scope of the disclosure. For example, other alternate systems may include any combinations of structure and functions described above or shown in the figures.

We claim:

1. An apparatus comprising:
a memory configured to store a program for a scheduler and a program for each of a first thread and a second thread pending execution in the apparatus;
a processor configured to execute the program for the scheduler wherein the scheduler selects a one of the first or second thread and wherein the processor executes the program for the selected one of the first or second thread;
a logic element configured to receive an asynchronous event and a thread identifier uniquely identifying the selected thread, and to produce a concatenated event identifier comprising the received thread identifier and the received asynchronous event, wherein the received asynchronous event is received in response to an execution of an instruction caused by the selected thread, wherein the received asynchronous event indicates the execution of the instruction, and wherein either the first thread or second thread is capable of causing execution of the instruction; and
a timestamp configuration register comprising a first group of one or more bits for configuring a periodicity of a series of periodic events and a second group of one or more bits for configuring a precision of a timestamp fraction of the asynchronous event relative to one of the periodic events.

2. The apparatus of claim 1 further comprising:
a register configured to receive the concatenated event identifier;
a counter configured to receive a clock signal and generate the series of periodic events of the configured periodicity;
a timestamp fraction generator coupled to the register and configured to generate the timestamp fraction in response to the concatenated event identifier being received by the register, wherein generating the timestamp fraction comprises obtaining a count from the counter following the time the event is received; and
an event code generator configured to receive the timestamp fraction and the concatenated event identifier and generate an event code comprising at least the timestamp fraction and an identifier derived from the concatenated event identifier.

3. The apparatus of claim 2, wherein the count is a function of a change in the value of the counter since the last generated periodic event.

4. The apparatus of claim 3, wherein the count represents a time elapsed since the last generated periodic event.

5. The apparatus of claim 4, wherein the asynchronous event is of a unique type within one of a set of types of asynchronous events.

6. The apparatus of claim 5, wherein the set of types of asynchronous events occur at a common maximum rate.

7. The apparatus of claim 6, wherein the periodicity of the periodic events is configured by the timestamp configuration register to be a function of the maximum rate.

8. A method implemented in a device to generate an event code, the method comprising:
receiving a thread identifier uniquely identifying either a selected one of a first or a second thread, wherein a scheduler selects the one of the first or second thread and wherein a processor executes the selected one of the first or second thread;
generating a concatenated event identifier comprising the thread identifier and a received asynchronous event, wherein the asynchronous event is received in response to an execution of an instruction caused by the selected thread, wherein the asynchronous event indicates the execution of the instruction and wherein either the first thread or second thread is capable of causing execution of the instruction; and
setting a first group of one or more bits of a time stamp configuration register for configuring a first periodicity at which a first set of periodic events are generated, wherein the timestamp configuration register further comprising a second group of one or more bits for configuring the precision of a timestamp fraction of the asynchronous event relative to one of the first set of periodic events.

9. A method of claim 8 further comprising:
configuring a first source to generate the first set of periodic events at a first rate according the first periodicity;
receiving periodic events from the first source;

in response to receiving the concatenated event identifier, determining the timestamp fraction, wherein the timestamp fraction represents a time lapse between a previously received periodic event from the first source and when the asynchronous event was concatenated with the event identifier; and generating the event code, the event code comprising the timestamp fraction relative to another event and an identifier derived from the concatenated event identifier.

10. The method of claim 9, wherein the asynchronous event is one of a first set of asynchronous events and the first set of asynchronous events occur at a first maximum rate.

11. The method of claim 10, wherein the first rate for generating the periodic events by the first source is determined by the first maximum rate.

12. The method of claim 9, further comprising generating a periodic event code in response to receiving a periodic event from the first source.

13. The method of claim 12, wherein generating the periodic event code further comprises including in the generated periodic event code information indicating the status of the device.

14. The method of claim 11, further comprising configuring a second source to generate periodic events at a second rate wherein the second rate is determined by a second maximum rate at which a second set of asynchronous events occur.

15. The method of claim 14, further comprising in response to receiving a second asynchronous event from the second set of asynchronous events, determining a timestamp fraction, wherein the timestamp fraction represents a time lapse between a previously received periodic event from the second source and when the second asynchronous event was generated.

16. The method of 14 wherein the second maximum rate is different from the first maximum rate.

* * * * *